United States Patent [19]

Pralus et al.

[11] Patent Number: 4,996,039
[45] Date of Patent: Feb. 26, 1991

[54] PRODUCTION OF HYDROGEN PEROXIDE

[75] Inventors: Christian Pralus, Saint-Cyr-Au-Mont-D'Or; Jean-Pierre Schirmann, Oullins, both of France

[73] Assignee: Atochem, Puteaux, France

[21] Appl. No.: 420,514

[22] Filed: Oct. 12, 1989

[30] Foreign Application Priority Data

Oct. 12, 1988 [FR] France .................. 88 13671

[51] Int. Cl.$^5$ .................................. C01B 15/01
[52] U.S. Cl. ...................................... 423/584
[58] Field of Search ............................ 423/584

[56] References Cited

U.S. PATENT DOCUMENTS 4,009,252  2/1977  Izumi et al. ............... 423/584
4,279,883  7/1981  Izumi et al. ............... 423/584

FOREIGN PATENT DOCUMENTS 0132294  1/1985  European Pat. Off. .
 296357  1/1917  Fed. Rep. of Germany .
2334622  7/1977  France .
 120045  11/1919  United Kingdom .
1056126  1/1967  United Kingdom ............ 423/584
1490925  11/1977  United Kingdom .

Primary Examiner—Wayne A. Langel
Attorney, Agent, or Firm—Burns, Doane, Swecker & Mathis

[57]  ABSTRACT

Hydrogen peroxide is produced from hydrogen and oxygen by (a) intimately contacting gaseous hydrogen at superatmospheric pressure with an inorganic aqueous reaction medium which includes a catalytically effective amount of a platinum group metal catalyst, (b) next diminishing the amount of hydrogen in the gaseous phase to a value under the explosive/flammable limits of admixture thereof with the gaseous oxygen introduced in step (c), and (c) intimately contacting and reacting the aqueous reaction medium and diminished gaseous phase with a source of gaseous oxygen.

11 Claims, No Drawings

PRODUCTION OF HYDROGEN PEROXIDE

BACKGROUND OF THE INVENTION

1. Field of the Invention

The present invention relates to an improved process for the production of hydrogen peroxide from hydrogen and oxygen, and, more especially, to the production of $H_2O_2$ from oxygen and hydrogen in the presence of an aqueous medium comprising a catalyst based on a precious metal of Group VIII of the Periodic Table, a platinum group metal, in the absence of organic compounds in such reaction medium

2. Description of the Prior Art

It is known to this art to produce hydrogen peroxide by an oxygen/hydrogen process of the above basic type. Compare, for example, U.S. Pat. Nos. 4,681,751, 4,661,337, 4,279,883 and 4,009,252 and EP No. 0,274,830.

While such a process avoids the dangers inherent in the presence of an organic compound in the reaction medium, it presents the risk of explosion associated with a mixture of hydrogen and oxygen alone, unless the reaction mixture is diluted with a very high proportion of an inert gas, or has a predetermined oxygen/hydrogen ratio, or else if a great investment has been made in the hardware for precisely regulating the flowstreams of the respective gases and mixtures thereof.

SUMMARY OF THE INVENTION

Accordingly, a major object of the present invention is the provision of an improved process for the production of hydrogen peroxide from oxygen and hydrogen, which improved process not only satisfies all criteria of safety, but also permits any proportion of hydrogen and oxygen to be used, with the option of recycling either gas.

Briefly, the present invention features a catalytic process for the production of hydrogen peroxide by reacting hydrogen with oxygen at a pressure greater than atmospheric, in an aqueous medium free of organic compounds which comprises a platinum group precious metal catalyst, said process comprising:

(i) a first stage, in which the aqueous medium is contacted with hydrogen;

(ii) a second stage, in which the aqueous medium resulting from the first stage is contacted with oxygen and hydrogen; and further wherein the hydrogen utilized in the second stage is that fraction coexisting with the aqueous medium resulting from the first stage, after the amount thereof has been sufficiently diminished such that, with the oxygen, the gaseous phase in the second phase is neither flammable nor explosive.

DETAILED DESCRIPTION OF THE PREFERRED EMBODIMENTS OF THE INVENTION

More particularly according to the present invention, to ensure that only the portion of hydrogen required for the second stage remains in contact with the aqueous medium resulting from the first stage of the reaction, the fraction of hydrogen that is not required is conveniently diminished, for example by reducing the pressure to essentially atmospheric pressure and then sweeping the gaseous phase with an inert gas, such as nitrogen.

This embodiment of operation is particularly suitable when the process is carried out discontinuously.

In alternative fashion, the same result is accomplished by simply removing the aqueous medium resulting from the first stage of the contacting of the aqueous medium with the gaseous phase.

This embodiment of operation is particularly suitable when the process is carried out continuously.

In both the continuous and discontinuous operations, the aqueous medium recovered after the second stage of the reaction may be recycled and again subjected to the process of the invention.

Specifically as regards the inflammability and explosivity of the gaseous phase, reference is made, for example, to Bulletin 503, Bureau of Mines, 1952, "Limits of Flammability of Gases and Vapors", by H. F. Coward and G. W. Jones.

The basic process of the invention, with the obvious exception of the characterizing two-stage parameters, may be carried out employing known techniques.

For example, the aqueous medium may be water alone, but preferably it comprises an aqueous solution containing an acid, such as hydrochloric acid, and, optionally, such ions as halide ions, and stabilizers for the hydrogen peroxide, such as phosphate values.

As regards the catalyst, it is preferably used in a supported form. Among the precious metals of the platinum group, platinum itself and palladium are the preferred.

The process is advantageously carried out in a tight, pressure and corrosion resistant reactor, especially tight relative to hydrogen, and fitted with the usual necessary auxiliary systems, such as, for example, means for the control of temperature and pressure For a more detailed description of the aqueous reaction medium, the catalyst and the particular apparatus, see U.S. Pat. Nos. 3,336,112, 3,361,533, 4,009,252, 4,279,883 and 4,681,751 and EP No. 0,274,830.

The temperature at which the process is carried out typically ranges from about $-10°$ to $+30°$ C.

The hydrogen pressure applied in the first stage may vary over rather wide limits, for example from 5 bars to 100 bars.

The oxygen pressure applied in the second stage may also vary over a wide range, for example from about 5 bars to 100 bars.

In order to further illustrate the present invention and the advantages thereof, the following specific examples are given, it being understood that same are intended only as illustrative and in nowise limitative.

EXAMPLE 1

In a 0.3 l metal autoclave, the walls and the agitating and temperature control means of which were protected by a polytetrafluoroethylene lining, an aqueous reaction medium comprising 20 cm$^3$ of a 0.1 N aqueous solution of hydrochloric acid and 0.03 g of a 5% palladium-on-carbon catalyst (marketed by Engelhard) was contacted with 50 bars of hydrogen for 3 hours, under agitation and at a temperature of $+10°$ C.

After this period of 3 hours, the pressure in the autoclave containing the gaseous phase in contact with the aqueous reaction medium containing the catalyst was reduced to essentially atmospheric pressure, while maintaining the temperature at $+10°$ C. but without agitation, whereupon a flow of nitrogen was next introduced into the gaseous phase until it contained less than 4.5% hydrogen by volume.

An oxygen pressure of 70 bars was then established in the autoclave and the gaseous phase and the aqueous medium were intimately contacted at +10° C. under agitation for 20 min.

At the completion of this time period, the aqueous reaction medium contained 5.1 mg hydrogen peroxide

EXAMPLE 2

The procedure of Example 1 was repeated, but the amount of catalyst used was 0.3 g. Following the introduction of the oxygen, the aqueous reaction medium contained 10 mg of hydrogen peroxide.

EXAMPLE 3

The procedure of Example 1 was repeated, but using in place of 0.03 g of the palladium catalyst, 0.03 g of a 10% platinum-on-carbon catalyst (marketed by Merck). After the introduction of the oxygen and the intimate contacting step, the aqueous reaction medium contained 6 mg of hydrogen peroxide.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of hydrogen peroxide, comprising (a) intimately contacting a gaseous phase comprising gaseous hydrogen at superatmospheric pressure with an inorganic aqueous reaction medium which comprises a catalytically effective amount of a platinum group metal catalyst, (b) next diminishing the amount of hydrogen in said gaseous phase to a value under the explosive/flammable limits of admixture thereof with the gaseous oxygen introduced in step (c), and (c) intimately contacting said aqueous reaction medium and diminished gaseous phase with a source of gaseous oxygen, the hydrogen contacted with said source of gaseous oxygen being that fraction coexisting with said aqueous medium resulting from step (b), wherein the gaseous phase of hydrogen and oxygen resulting from step (c) is neither flammable nor explosive.

2. The process as defined by claim 1, carried out in a confined reaction zone, comprising releasing the pressure therein to essentially atmospheric pressure following said step (a), and (b diminishing the amount of hydrogen in the gaseous phase by sweeping said confined reaction zone with an inert gas.

3. The process as defined by claim 2, said inert gas comprising nitrogen.

4. The process as defined by claim 1, comprising (b) diminishing the amount of hydrogen in the gaseous phase by removing said aqueous reaction medium after the step (a).

5. The process as defined by claim 1, said metal catalyst comprising platinum or palladium.

6. The process as defined by claim 1, comprising carrying out the step (a) under a hydrogen pressure of from 5 to 100 bars.

7. The process as defined by claim 6, comprising carrying out the step (c) under an oxygen pressure of from 5 to 100 bars.

8. The process as defined by claim 7, carried out at a temperature ranging from −10° to +30° C.

9. The process as defined by claim 1, said aqueous reaction medium comprising halide ions.

10. The process as defined by claim 1, said aqueous reaction medium comprising an $H_2O_2$ stabilizer.

11. The process as defined by claim 1, wherein the aqueous reaction medium in the step (a) comprises a medium recycled from step (c).

* * * * *